United States Patent [19]

Guo

[11] Patent Number: 5,253,133

[45] Date of Patent: Oct. 12, 1993

[54] PORTABLE MODULAR HARD DISK DRIVE

[75] Inventor: David C. Guo, Sunnyvale, Calif.

[73] Assignee: CCT Inc., Palo Alto, Calif.

[21] Appl. No.: 817,471

[22] Filed: Jan. 3, 1992

[51] Int. Cl.[5] .............................................. G11B 17/02
[52] U.S. Cl. ................................ 360/97.01; 360/97.02
[58] Field of Search ............... 360/97.01, 98.01, 97.02, 360/97.03, 97.04

[56] References Cited

U.S. PATENT DOCUMENTS

| | | | |
|---|---|---|---|
| 3,975,768 | 8/1976 | Jacques et al. | 360/99 |
| 4,444,187 | 11/1984 | Alaimo | 360/77 |
| 4,503,474 | 3/1985 | Nigam | 360/133 |
| 4,504,879 | 3/1985 | Toldi et al. | 360/105 |
| 4,532,264 | 7/1985 | Larson et al. | 360/97 |
| 4,550,355 | 10/1985 | Larson et al. | 360/133 |
| 4,559,575 | 12/1985 | Noto et al. | 360/133 |
| 4,683,506 | 7/1987 | Toldi et al. | 360/105 |
| 4,717,981 | 1/1988 | Nigam et al. | 360/133 |
| 4,722,012 | 1/1988 | Toldi et al. | 360/97 |
| 4,853,807 | 8/1989 | Trager | 360/97.01 |
| 4,870,518 | 9/1989 | Thompson et al. | 360/97.01 |
| 4,965,685 | 10/1990 | Thompson et al. | 360/97.01 |
| 4,965,691 | 10/1990 | Iftikar et al. | 360/133 |
| 5,113,297 | 5/1992 | Yoshida | 360/97.01 |

Primary Examiner—Robert S. Tupper
Attorney, Agent, or Firm—Thomas E. Schatzel

[57] ABSTRACT

Disclosed is a portable modular hard disk drive featuring an impact resistant case containing a hard disk drive. The hard disk drive may be mounted on a computer in such a manner that it resides on the back of, is powered by and controlled by the host computer. The invention features a like connector on its back so that additional portable modular hard disk drives may be attached to the first, powered and controlled in a like manner. The invention also possesses a belt clip for ease of carrying.

7 Claims, 2 Drawing Sheets

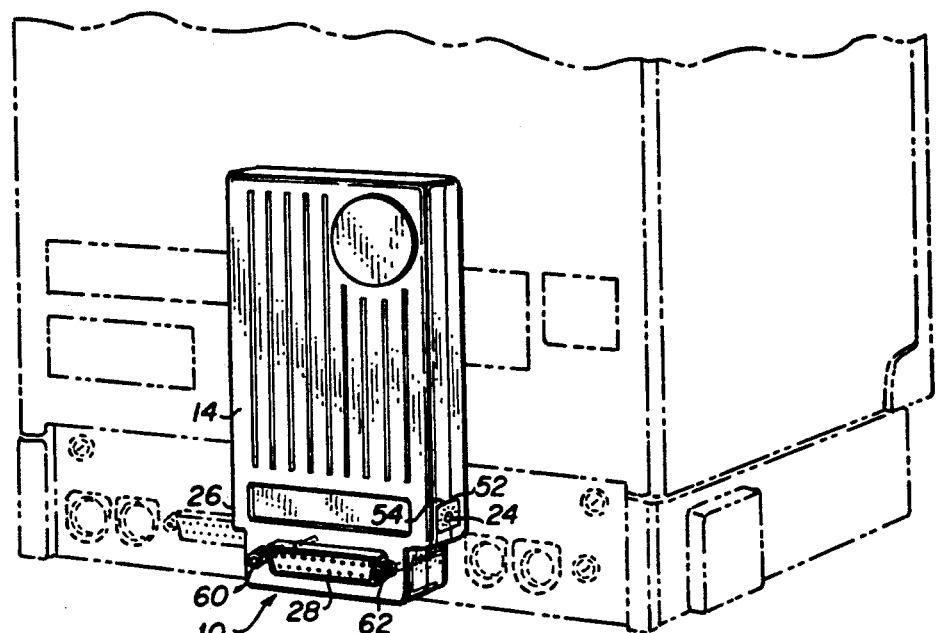
Fig_1
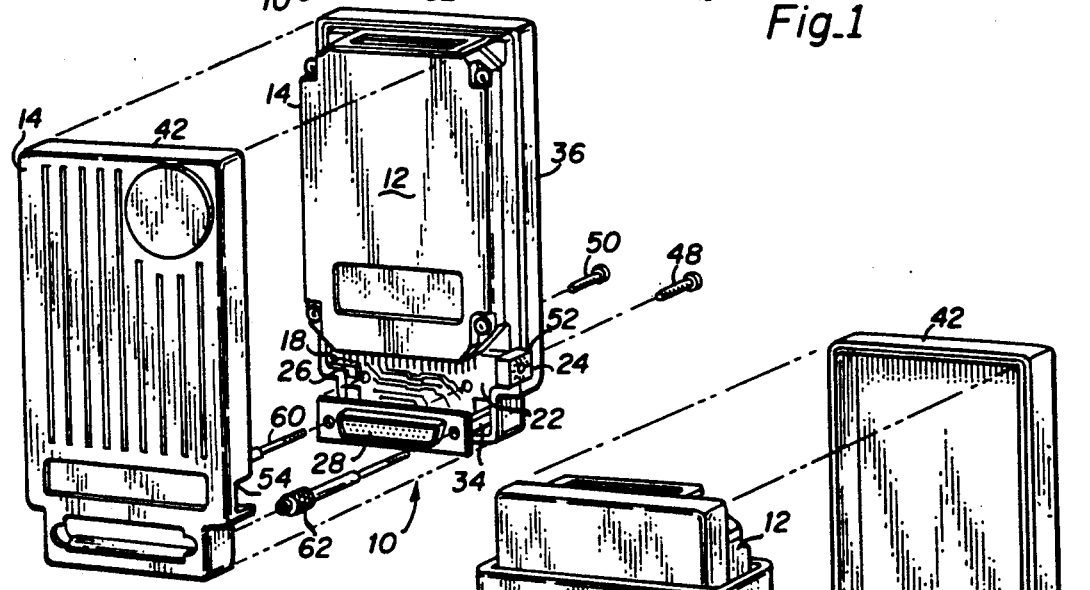
Fig_2
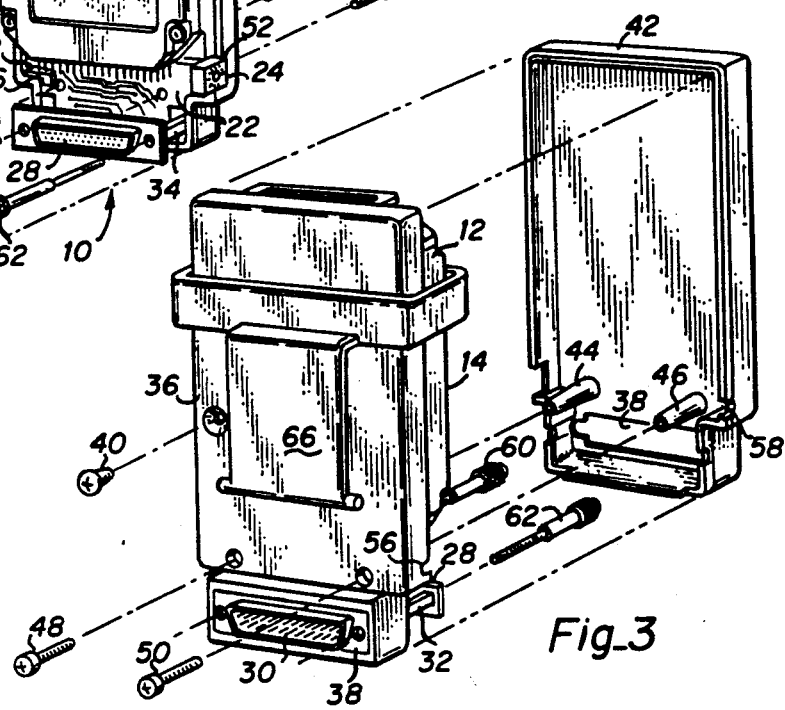
Fig_3

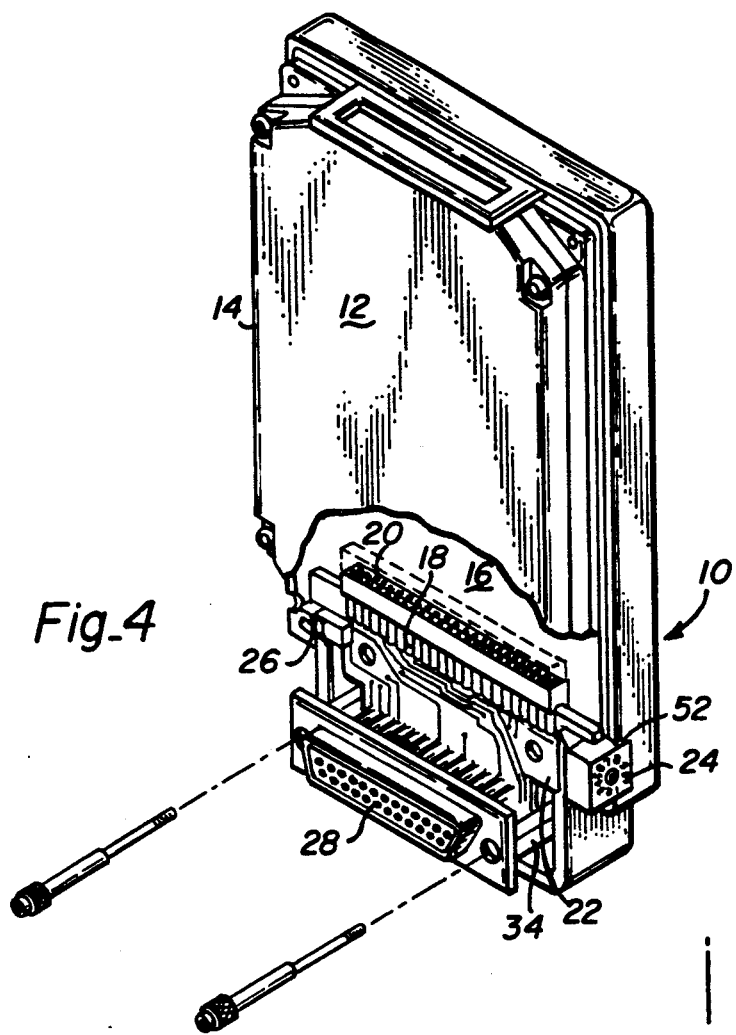
Fig_4
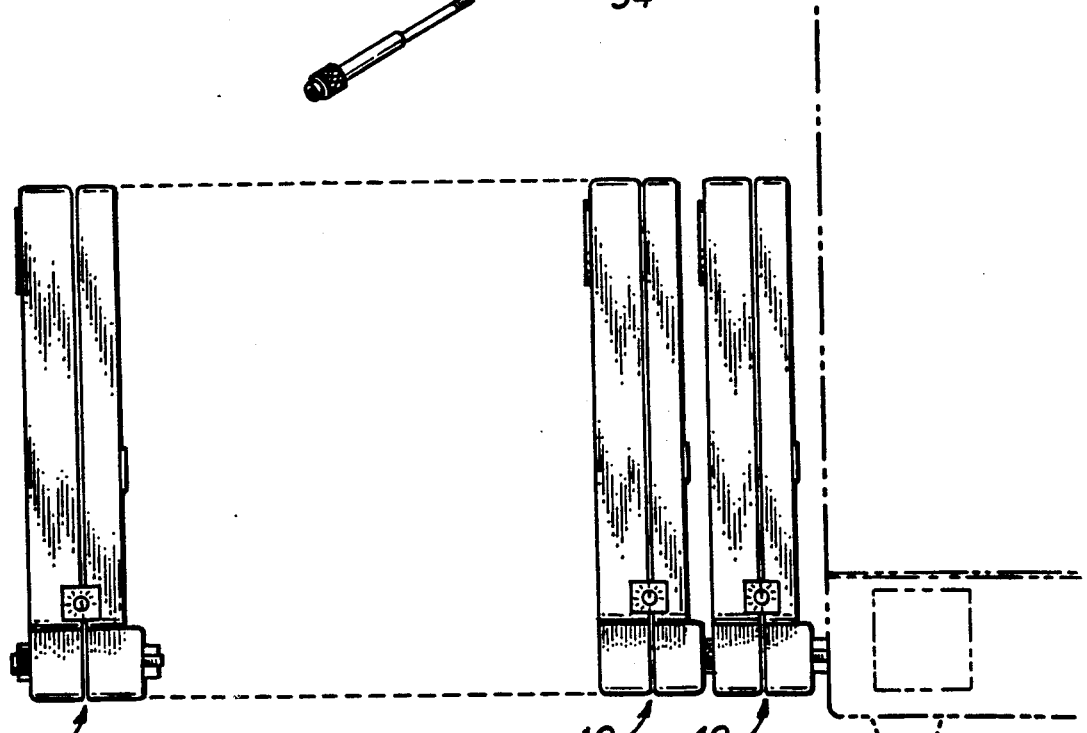
Fig_5

PORTABLE MODULAR HARD DISK DRIVE

BACKGROUND OF THE INVENTION

1. Field of the Invention

The present invention relates generally to hard disk drives and more particularly to portable, modular, interchangeable hard disk drives.

2. Description of the Prior Art

Hard disk drives are commonly used information storage and retrieval devices for personal computers. Hard disk drives combine rapid accessibility, high volume storage and low data volatility. Common hard disk drives lack ease of portability and expandability.

Additionally, the present cartridge hard disk drives require the use of data or power cables, thus causing potential compatibility or reconfiguration problems.

Portability and expandability are currently provided by interchangeable hard disk cartridges. Hard disk cartridge drives normally consist of a drive unit installed on the computer and a cartridge containing the hard disk. The cartridge may be removed and replaced, giving additional storage volume. The cartridge may be combined with a similar drive on another computer, thus providing a measure of portability.

Among the numerous hard disk drive cartridges known in the prior art are those disclosed in U.S. Pat. No. 3,975,768 Jacques; 4,503,474 Nigam; 4,870,518 Thompson; 4,965,685 Thompson and 4,965,691 Iftikar.

The prior art cartridge hard disk drives have a number of disadvantages. In order to use the cartridge a recording head must be introduced into the body of the cartridge through a hole. Contaminants may be introduced through the hole into the body of the cartridge. Retrieval of data on separate disks requires the physical switching of cartridges with the attendant loss of speed and convenience. Use of the cartridges is restricted to computers having compatible drive units. Repeated removal and replacement of the cartridge may lead to wear which will, in turn, lead to failure of the unit due to a failure to meet the close tolerances involved.

SUMMARY OF THE PRESENT INVENTION

It is therefore an object of the present invention to provide a modular hard disk drive transferrable among like computers without modification and without need for a data cable.

It is another object of the invention to provide a portable hard disk drive subject to less contamination than that of the prior art.

It is another object of the invention to provide pass through access to multiple hard disks without the necessity of exchanging cartridges.

It is a further object of the present invention to provide a hard disk drive that does not require power from an external power source such as an alternating current power source.

Briefly, in a preferred embodiment, the present invention comprises a small, self-contained hard disk drive. An electronic circuit board creates the appropriate power and data transfer interface between the drive and the computer. A case contains and protects the internal components. A connector (commonly an DSUB 25 pin connector), on the outside of the case, physically and electronically links the circuit board and the computer. A second connector, on the obverse of the case, is used to allow connection and usage of additional portable modular hard disk drives.

An advantage of the invention is that it is small in size and easily transferrable between computers.

Another advantage of the invention is that it allows for the simultaneous usage of multiple hard disk drives.

Another advantage of the invention is that it provides a portable hard disk drive capability with decreased risk of contamination and wear. The portability of the invention is enhanced by the provision of a belt clip.

These and other objects and advantages of the present invention will no doubt become obvious to those of ordinary skill in the art after having read the following detailed description of the preferred embodiment which is illustrated in the various drawing figures.

IN THE DRAWINGS

FIG. 1 is a perspective view of the invention from the front, showing its approximate size and the positioning of the first connector;

FIG. 2 is a cut-away view of the device of FIG. 1, showing the relative positioning of the hard disk drive, circuit board, and SCSI selector;

FIG. 3 is a back view of the device of FIG. 1, showing the relative positioning of the retention screws and second connector;

FIG. 4 is a perspective view of the inside of the back case of the device of FIG. 1; and FIG. 5 is a side view of the device of FIG. 1, as installed, showing the device stacked with additional hard disk drives of the same configuration.

DETAILED DESCRIPTION OF THE PREFERRED EMBODIMENT

FIGS. 1-4 show perspective views of the portable, modular hard disk drive of the present invention which is designated by the general reference number 10. Modular drive 10 comprises a hard disk drive 12. The hard disk drive 12 has a frontal surface 14 (FIGS. 2 and 4) and an interior surface 16 (FIG. 4). A fifty (50) pin male connector 18 resides on the interior 50 surface 16. The fifty (50) pin male connector 18 connects with a fifty pin (50) female connector 20. The fifty pin (50) female connector is connected to a circuit board 22.

Resident on the circuit board 22 and visible in FIGS. 1 and 2, are the SCSI selector 24, power input port 26 and first DSUB 25 pin connector 28. The power input port 26 is of a type suitable for connection via cable to the keyboard port of the host computer. Resident on the circuit board and visible in FIG. 3 is the second DSUB 25 pin connector 30.

Rigidly connecting DSUB 25 pin connector 28 and DSUB 25 pin connector 30 are hollow support post 32 and hollow support post 34. The second DSUB 25 pin connector is press fit to the back case half 36 through aperture 3B. The back case half 36 is secured to the hard disk drive 12 by means of retention screw 40. Press fitted to the back case half 36 is the front case half 42.

The front case half 42 possesses retention posts 44 and 46. The front case half 42 is secured to the back case half 36 by means of retention screws 48 and 50 which screw into retention posts 44 and 46.

The SCSI selector fits into notches 52 and 54 on the back case half 36 and front case half 42, respectively. The power input port 26 is accessed through the aperture formed by a pair of notches 56 and 58 on the back case half 36 and front case half 42 respectively.

The modular drive 10 may be attached to the computer by means of attachment screws 60 and 62 which pass through support post 32 and support post 34 and thence into the computer.

A belt clip 66 is attached to the front case half 42 and the back case half 36.

The advantages of the present invention may now be readily understood. The invention allows the user to move the modular hard disk drive from one computer to another in a safe and convenient manner. The invention also allows the "stacking" of hard disk drives, as illustrated in FIG. 5, allowing both increased data storage capacity and the ability to immediately access data contained on multiple hard disk drives.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A portable, modular hard disk drive assembly (10) for mounting to a host computer, comprising:
   a hard disk drive (12) packaged within a casing (14, 36) and electrically joined with a first electrical connector (20) positioned adjacent an interior surface (16) of said casing (14);
   a second electrical connector (18) mating with said first electrical connector (20);
   a circuit board (22) connected to the second electrical connector (18) and containing connector means for transferring electrical power to, input data to and output data from the hard disk drive;
   a first joining connector (30) connected electronically to a front surface of the circuit board and for connection to a mating connector of a host computer to link the circuit board (22) to said host computer;
   a second joining connector (28) connected electronically to a back surface of the circuit board (22) and for connection to a mating connector of a portable modular hard disk assembly to link an additional portable modular had disk assembly;
   a plurality of hollow support posts (33; 34) rigidly connecting the first joining connector (30) to the second joining connector (28);
   a plurality of attachment screws (60, 62) passing through the hollow support posts (32, 34) and for attachment to a host computer;
   a back case half (36);
   a front case half (42), the front case half (42) being fit to the back case half (36) to contain the hard disk drive (12);
   a plurality of fasteners (48, 50) rigidly connecting the back case half (36) to the front case half (42); and
   a retention fastener (40) rigidly connecting the hard disk drive (12) and the back case half (36).

2. The device of claim 1 wherein,
   said first electrical connector and the second electrical connector are comprised of fifty (50) pin connectors.

3. The device of claim 1 wherein,
   the first joining connector and the second joining connector are comprised of DSUB 25 pin connectors.

4. The device of claim 1 wherein,
   said means for transferring input data to and output data from said hard disk comprises an SCSI selector (24).

5. The device of claim 1 wherein,
   the front and back case halves (36, 42) are comprised of impact resistant material.

6. The device of claim 1 wherein,
   the front and back case halves (36, 42) are comprised of ABS plastic.

7. The device of claim 1 further comprising,
   a belt clip (66) functionally attached circumferentially to the front and back case halves (36, 42).

* * * * *